US008753540B2

(12) United States Patent
Oh et al.

(10) Patent No.: US 8,753,540 B2
(45) Date of Patent: Jun. 17, 2014

(54) METHOD FOR PREPARING GRAPHENE SHEETS FROM TURBOSTRATIC GRAPHITIC STRUCTURE AND GRAPHENE SHEETS PREPARED THEREBY

(75) Inventors: Il Kwon Oh, Gwangju (KR); Vadahanambi Sridhar, Andhra Pradesh (IN); Jin Han Jeon, Gwangju (KR)

(73) Assignee: Industry Foundation of Chonnam National University, Gwangju (KR)

( * ) Notice: Subject to any disclaimer, the term of this patent is extended or adjusted under 35 U.S.C. 154(b) by 0 days.

(21) Appl. No.: 12/921,604

(22) PCT Filed: Apr. 23, 2010

(86) PCT No.: PCT/KR2010/002551
§ 371 (c)(1),
(2), (4) Date: Sep. 9, 2010

(87) PCT Pub. No.: WO2011/083895
PCT Pub. Date: Jul. 14, 2011

(65) Prior Publication Data
US 2012/0269716 A1 Oct. 25, 2012

(30) Foreign Application Priority Data
Jan. 8, 2010 (KR) .......................... 10-2010-0001893

(51) Int. Cl.
*C04B 20/06* (2006.01)
(52) U.S. Cl.
USPC .................. 252/378 R; 423/460; 977/755
(58) Field of Classification Search
USPC ................ 423/448, 460; 252/378 R; 977/755
See application file for complete search history.

(56) References Cited

U.S. PATENT DOCUMENTS

| 7,071,258 | B1 | 7/2006 | Jang | |
|---|---|---|---|---|
| 2008/0048152 | A1 | 2/2008 | Jang | |
| 2008/0248275 | A1* | 10/2008 | Jang et al. | 428/220 |
| 2008/0258359 | A1 | 10/2008 | Zhamu | |
| 2009/0028778 | A1* | 1/2009 | Zhamu et al. | 423/448 |
| 2012/0107593 | A1* | 5/2012 | Luo et al. | 428/220 |

OTHER PUBLICATIONS

Chen et al. "Preparation of graphene by the rapid and mild thermal reduction of graphene oxide induced by microwaves". Carbon 48 (2010) 1146-1152.*
B. Tryba, A.W. Morawski, M. Inagaki "Preparation of exfoliated graphite by microwave irradiation". Carbon, 43 (11) (2005), pp. 2417-2419.*
"Hydrogen Peroxide (H2O2): A Power Oxidizer". H2O2.com <http://www.h2o2.com/products-and-services/us-peroxide-technologies.aspx?pid=112&name=Hydrogen-Peroxide> Accesed Feb. 13, 2013.*
Sasha Stankovich, "Synthesis of Graphene-Based Nanosheets Via Chemical Reduction of Exfoliated Graphite Oxide", Carbon, Jul. 1, 2007, pp. 1558-1565, vol. 45/No. 7.

(Continued)

*Primary Examiner* — Stanley Silverman
(74) *Attorney, Agent, or Firm* — John K. Park; Park Law Firm (57) ABSTRACT

The present invention relates to a method for preparing graphene, and more particularly to a method of preparing graphene sheets, which can prepare graphene sheets from a turbostratic graphitic structure such as carbon fiber in higher yield without using a strong oxidizing agent, and to graphene sheets prepared thereby.

8 Claims, 6 Drawing Sheets

(56) References Cited

OTHER PUBLICATIONS

Isabela Janowska, "Catalytic Unzipping of Carbon Nanotubes to Few-Layer Graphene Sheets Under Microwaves Irradiation", Applied Catalysis A: General, Dec. 15, 2009, pp. 22-30, vol. 371/No. 1-2, Elsevier Science, Amsterdam, NL.

Wufeng Chen, "Preparation of Graphene by the Rapid and Mild Thermal Reduction of Graphene Oxide Induced by Microwaves", Carbon, Nov. 26, 2009, pp. 1146-1152, vol. 48/No. 4, Elsevier Science, Oxford, GB.

Yenny Hernandez, "High-Yield Production of Graphene by Liquid-Phase Exfoliation of Graphite", Nature Nanotechnology, Aug. 10, 2008, vol. 3/No. 563, Macmillion Publishers Ltd.

Dan Li, "Processable Aqueous Dispersions of Graphene Nanosheets", Nature Nanotechnology, Jan. 27, 2008, pp. 101-105, vol. 3,27, Macmillion Publishers Ltd.

Sasha Stankovich, "Graphene-Based Composite Materials", Nature, Jul. 20, 2006, pp. 282-286, vol. 442, Nature Publishing Group.

* cited by examiner

METHOD FOR PREPARING GRAPHENE SHEETS FROM TURBOSTRATIC GRAPHITIC STRUCTURE AND GRAPHENE SHEETS PREPARED THEREBY

TECHNICAL FIELD

The present invention relates to a method of preparing graphene sheets, and more particularly to a method of preparing graphene sheets, which can prepare graphene sheets from a turbostratic graphitic structure in higher yield without using a strong oxidizing agent, and to graphene sheets prepared thereby.

BACKGROUND ART

Graphene is a monolayer of carbon atoms densely packed in a benzene ring structure and forms blocks of various structures, such as carbon black, carbon fiber, carbon nanotubes and fullerene.

Such graphene is an intriguing 2D flat material consisting of monolayer carbon atoms, and the free and fixed individual graphene sheets possess distinct properties and have promising applications in nanoscale engineering and the fabrication of nanoscale systems.

Namely, the distinct properties of graphene make it very promising in various applications such as field-effect transistors, lithium-ion batteries, hydrogen storage, molecular sensors, actuators, and reinforcing fillers in high-performance polymer nanocomposites.

Since producing graphene by mechanical exfoliation (peeling off method) was first reported, a wide range of techniques for synthesizing graphene, which can be divided into top-down and bottom-up processes, have been developed.

In bottom-up methods such as thermal chemical vapor deposition (CVD), graphene is synthesized by allowing graphene precursor particles to gradually grow in size, that is, graphene grows because of epitaxial growth on substrates or graphene platelets are grown by CVD. Theoretically, it is possible to control the size, shape, size distribution and agglomeration using the bottom-up processes, but it is actually very difficult to realize this control. Although CVD allows high-quality graphenes to be produced, it causes environmental concerns about the emission of PAH (polyaromatic hydrocarbons) (see the instructions of the California Environmental Protection Agency (EPA)).

The more common top-down process includes stripping individual graphene sheets off of graphitic structures such as expanded graphite and carbon nanotubes. Many techniques for obtaining monolayers have been developed, including physical methods of hand-stripping individual graphene layers using Scotch tape, electrochemical methods using an ionic liquid as a solvent, and the thermal and chemical exfoliation of expanded graphite oxide.

In such top-down processes, graphitic microstructures such as graphite, carbon fibers and carbon nanotubes are used as starting materials, individual graphene layers are extracted or peeled either by physical, electrochemical or chemical methods.

Particularly, exfoliation of individual graphene sheets from graphene oxide is the most common method, and many techniques capable of successfully obtaining monolayered graphenes have been reported, but such methods for producing graphene platelets from graphite are carried out using oxidizing agents such as sulfuric acid/potassium permanganate ($KMnO_4$) and are followed by a reduction reaction with any one of hydrazine and alkali or solvent etching.

Very excellent methods for the production of graphene that have most recently become known are based on the longitudinal unzipping of multiwalled carbon nanotubes (MWCNTs) by physical or chemical methods. These novel techniques are attractive because of their convenience and can provide graphene sheets having a previously defined shape, but have a problem in that a number of nanoholes can occur in graphene layers due to excessive, localized oxidation.

Most chemical methods known to date extensively rely on the usage of strong oxidizing agents such as sulfuric acid/potassium permanganate ($KMnO_4$), carboxylic acid or formic acid and on the excessive use of environmentally harmful organic solvents to create additional exfoliation.

In addition, the above-described techniques based on longitudinal unzipping are based on the extraction of graphene from carbon structures, in which the graphene layers are arranged in a perfect AB stacking structure. However, there are many carbon structures in which the packing of graphene layers is not perfect AB stacking. Rather, the structures are fundamentally composed of graphene crystallites which are slightly randomly arranged with respect to their common vertical axis without an almost perfect orientation. Biscoe and Warren proposed the term "turbostratic structure". Carbon black, carbon fibers and vapor growth carbon nanofibers (VGCNFs) all have the turbostratic structure. In graphitic structures having this turbostratic structure, the graphite crystallite layers are randomly rotated with respect to each other, even though they still have c-direction orientation.

Accordingly, there has also been a need for a method of preparing graphene sheets from graphene layers constituting a turbostratic graphitic structure.

DISCLOSURE

Technical Problem

The present inventors have conducted studies to solve the above-described problems and, as a result, have developed a method of preparing graphene sheets from a turbostratic graphitic structure in higher yield without using a strong oxidizing agent, thereby completing the present invention.

It is, therefore, an object of the present invention to provide a method of preparing graphene sheets from a turbostratic graphitic structure having an increased inter-gallery spacing between adjacent graphitic layers without the use of sulfuric acid/potassium permanganate ($KMnO_4$), carboxylic acid or formic acid or the excessive use of environmentally harmful organic solvents to generate additional exfoliation, and graphene sheets prepared thereby.

Another objective of the present invention is to provide a method of preparing graphene sheets, which is suitable for synthesizing graphene sheets in large scale at low cost with a short preparation time, and graphene sheets prepared thereby.

Still another objective of the present invention is to provide a method of preparing graphene sheets, which can provide high-quality graphene sheets and has higher yield, because it can minimize problems associated with excessive oxidation, and graphene sheets prepared thereby.

Objectives of the present invention are not limited to the above-mentioned objects, and other objects of the present invention can be clearly understood by those skilled in the art from the following description.

Technical Solution

To achieve the above objectives, the present invention provides a method for preparing graphene sheets, the method comprising the steps of: oxidizing a graphitic structure having a turbostratic structure; subjecting the oxidized graphitic structure to microwave irradiation; and sonicating the few-layer graphene obtained by the microwave irradiation step.

In a preferred embodiment, the oxidizing step is carried out by immersing the graphitic structure in hydrogen peroxide and ultrasonically treating the immersed graphitic structure.

In a preferred embodiment, the ultrasonic treatment is carried out for 20-40 minutes.

In a preferred embodiment, the microwave irradiation step is carried out at 150-550 W for 50-100 seconds after placing the oxidized graphitic structure in a microwave oven.

In a preferred embodiment, the sonication step is carried out by dispersing the few-layer graphene in an alcohol solvent and subjecting the dispersion to strong ultrasonic treatment for 60-240 minutes.

In a preferred embodiment, the sonication step further comprises a step of removing remaining oxide groups from separated graphene sheets.

The removal step is carried out by dispersing the graphene sheets in a hydrazine solution.

In a preferred embodiment, the graphitic structure is selected from the group consisting of carbon black, carbon fibers, and vapor growth carbon nanotubes.

In a preferred embodiment, the few-layer graphene has a curved or curled structure.

The present invention also provides graphene sheets prepared by the above-described method.

Advantageous Effects

The present invention has the following excellent effects.

First, the inventive method for preparing graphene sheets is environmentally friendly, because graphene sheets can be prepared from a turbostratic structure having an increased inter-gallery spacing without the use of a strong oxidizing agent such as sulfuric acid/potassium permanganate ($KMnO_4$), carboxylic acid or formic acid and the excessive use of environmentally harmful organic solvents to generate additional exfoliation.

The inventive method for preparing graphene sheets is suitable for synthesizing graphene sheets in large scale at low cost with a short preparation time.

The inventive method for preparing graphene sheets can provide high-quality graphene sheets and has higher yield, because it can minimize problems associated with excessive oxidation.

BEST MODE

Although terms used in the present invention are possibly selected from currently well-known names, some terms are arbitrarily chosen by the applicant in some cases so that their meanings can be explained in detail in the following description. Hence, the present invention should be understood in the context of the meanings of the corresponding terms being chosen by the applicant instead of using the simple names of the terms.

Hereinafter, the technical construction of the present invention will be described in detail with reference to the accompanying drawings and preferred embodiments.

However, the present invention is not limited to the embodiments described herein and can be embodied in other forms. Like reference numerals throughout the specification indicate like elements.

First, the present invention relates to a method of preparing graphene sheets, the method comprising the steps: oxidizing a turbostratic graphitic structure; subjecting the oxidized graphitic structure to microwave irradiation to obtain a few-layer graphene; and sonicating the few-layer graphene. The technical feature of the present invention is that a few-layer graphene is easily obtained by microwave irradiation. Herein, the microwave irradiation step may be carried out using a microwave oven at 150-500 W for 50-100 seconds, preferably at 150-250 W for 50-70 seconds.

As described above, the present invention introduces the microwave irradiation step that is very simple and convenient, whereby it does not need to use a strong oxidizing agent such as sulfuric acid/potassium permanganate ($KMnO_4$), carboxylic acid or formic acid in the oxidation step, can eliminate the excessive use of environmentally harmful organic solvent to generate additional exfoliation and can use a turbostratic structure having an increased inter-gallery spacing between adjacent graphitic layers.

In addition, it is possible to synthesize high-quality graphene sheets in large scale at low cost with a short preparation time.

As used herein, the term "graphitic structure" means any material consisting only of carbon atoms, and examples thereof include graphite, carbon black, carbon fibers and carbon nanotubes. Particularly, the present invention can provide the optimum conditions for preparing graphene sheets from a turbostratic graphitic structure in which a stack structure of graphene layers constituting the graphitic structure does not have perfect AB stacking as its arrangement.

EXAMPLE

Preparation of Graphene Sheet from Carbon Nanofibers

From turbostratic carbon nanofibers whose graphene layers were not arranged in a perfect AB stacking, graphene sheets were prepared in the following manner.

1. Oxidation Step

Finely cut carbon fibers were immersed in hydrogen peroxide, followed by ultrasonic treatment for 30 minutes. As a result, the outer sheath of the carbon fibers was oxidized, and the removal of the outer sheath and the partial expansion of the graphene layers were induced. Herein, the concentration of hydrogen peroxide is preferably 30-40%, and the weight ratio of carbon fibers:hydrogen peroxide is preferably 1:10.

2. Microwave Treatment Step

Next, the expanded carbon fibers were placed in a microwave oven and irradiated with microwaves at 200 W for 1 minute. The graphene layers of the carbon fibers were immediately expanded, and this expansion weakened the adhesion of the graphene layers. Also, the microwave irradiation rapidly boiled peroxide present in the platelets. This rapid boiling also partially removed remaining oxide and induced the graphenic structures to further expand.

3. Sonication Step

A few-layer graphene obtained after the microwave treatment step was dispersed in an alcohol solvent and subjected to strong sonication for 120 minutes to separate it into individual graphene sheets, thereby obtaining graphene sheets. Herein, the use of an ultrasonic horn can reduce the sonication time.

In some cases, the graphene sheets may be dispersed in a 5 wt % hydrazine solution, whereby oxide groups remaining on the graphene sheets can be completely removed, even though they are expected to be mostly removed by the microwave irradiation step. In addition, the separation of individual graphene sheets can also be promoted.

Next, the graphene sheets were collected on an AAO anodisc membrane in order to analyze their properties.

Test Example 1

Figure 1:
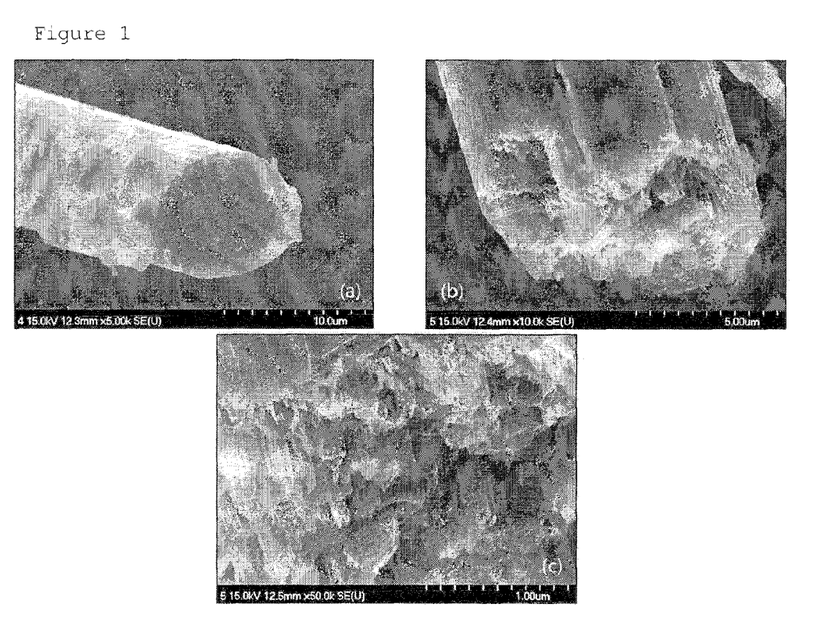
FIG. 1 is a set of SEM photographs showing the results of observing carbon fibers and expanded carbon fibers obtained after carrying out an oxidation step in one Example of the present invention.
Figure 2:
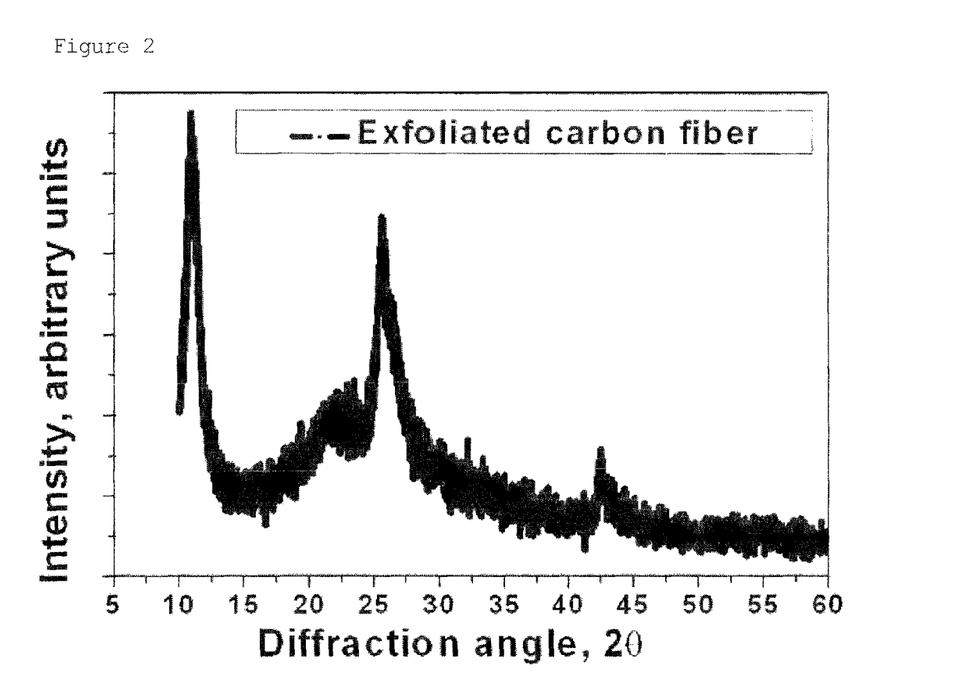
FIG. 2 is a graph showing XRD spectra for expanded carbon fibers obtained in one Example of the present invention.

Carbon fibers and the expanded carbon fibers obtained after carrying out the oxidation step in the above Example were observed with an SEM, and the results of the observation are shown in the photographs of FIG. 1. FIG. 2 shows an XRD spectra of the expanded carbon fibers.

In FIG. 1, (a) is an SEM photograph of the carbon fibers, and (b) and (c) are SEM photographs of the carbon fibers obtained after carrying out the oxidation step in the above Example. From the results of FIG. 1, it can be seen that the oxidation step in the Example caused a partial expansion of the graphene layers constituting the carbon fibers.

Also, in FIG. 2, these expanded carbon fibers exhibited a very sharp peak at 12° in addition to a normal graphitic peak at 26°, suggesting that the graphitic layers (i.e., graphene layers) were substantially expanded.

Test Example 2

Figure 3:
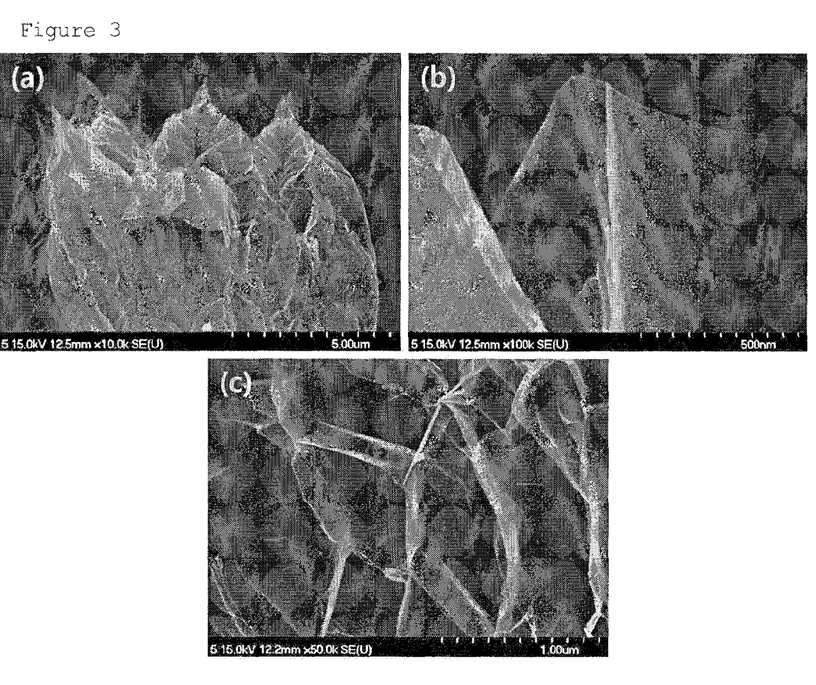
FIG. 3 is a set of SEM photographs showing the results of observing expanded carbon fibers obtained after microwave radiation in one Example of the present invention.
Figure 4:
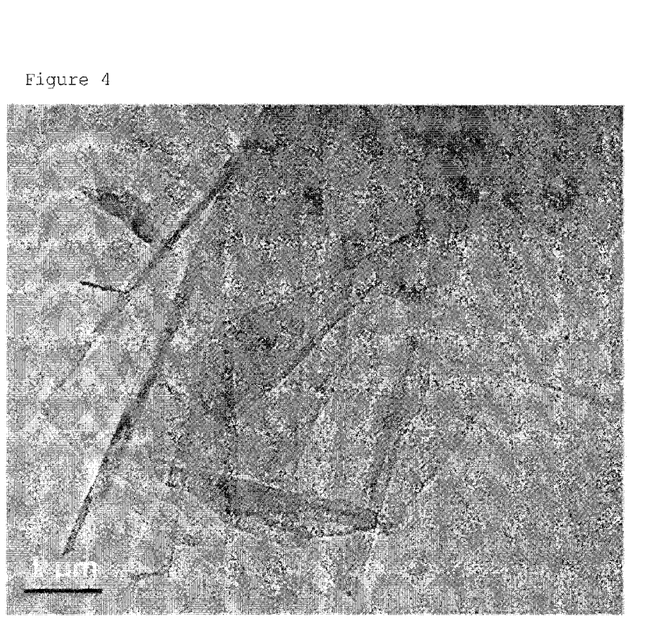
FIG. 4 is a TEM photograph showing the results of observing expanded carbon fibers obtained after microwave radiation in one Example of the present invention.

The expanded carbon fibers obtained after microwave irradiation in the above Example were observed with an SEM, and the results of the observation are shown in FIG. 3. FIG. 4 shows a photograph showing the results obtained by observing the expanded carbon fibers with a TEM.

In FIG. 3, few-layer or single-layer graphene was observed, suggesting that graphene layer stacks were formed by microwave irradiation. Particularly, the graphene layers stack or the monolayer graphene sheets were curled-up or onion-like structures. Van Hart et al explained this curling-up phenomenon in terms of the edge stability of graphitic structures. Namely, as described above, sharp edges and facets are less stable than structures having soft curves and curls, or the formation of spheres is induced by the need to minimize the surface area. Thus, the curving of graphene sheets in response to microwave irradiation is a surface stress-causing pressure phenomenon inducing the formation of an elliptic structure composed of weakly attached graphene sheets.

FIG. 4 is a TEM photograph of the graphene layer stack.

Test Example 3

Figure 5:
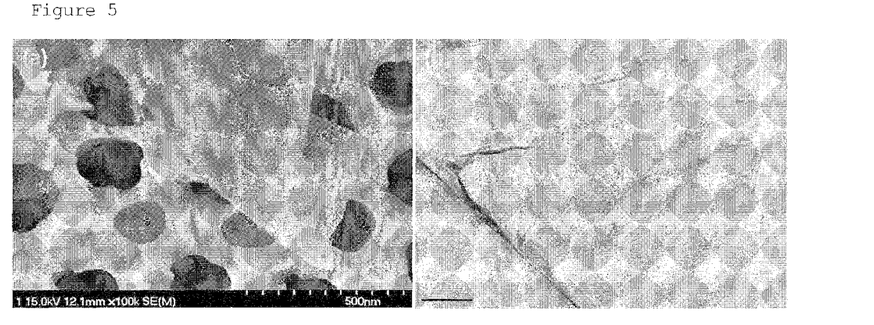
FIG. 5 is a set of SEM and TEM photographs showing the results of observing graphene sheets obtained in one Example of the present invention.

The graphene sheets obtained in the Example were observed with an SEM and a TEM, and the results of the observation are shown in FIG. 5.

Test Example 4

Figure 6:
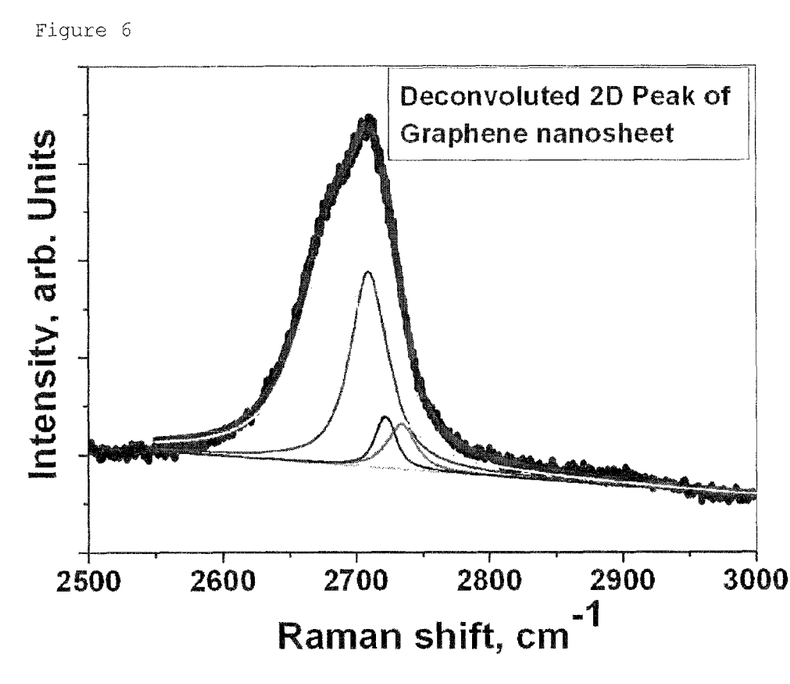
FIG. 6 is a graph showing the spectral results obtained by analyzing graphene sheets, collected in one Example of the present invention, using a Raman spectrometer.

The characteristics of the graphene sheets collected in the Example were analyzed using a Raman spectrometer, and the results of the analysis are shown in a graph of FIG. 6. Also, FIG. 7 shows XPS spectra for the graphene sheets.

In general, typical Raman spectra of carbon materials show common characteristics in the 800-2000 $cm^{-1}$ region: G and D peaks, which lie at around 1560 and 1360 $cm^{-1}$, respectively. The G peak corresponds to the $E_{2g}$ phonon at the Brillouin zone center. The D peak is due to the breathing modes of sp2 rings and requires a defect for its activation. It is common for as-prepared graphene not to have enough structural defects for the D peak to be Raman active, so that it can only be seen at the edges. However, the most prominent feature in graphene is the second order of the D peak (the 2D peak). This lies at around 2700 $cm^{-1}$. Its shape distinguishes single from multilayer samples.

As shown in FIG. 6, graphene sheets have a sharp, single 2D peak, in contrast with graphite and few-layer graphene. Also, in the Raman spectra, the shape of the G band indicates the number of layers in graphene. The G band spectra of graphene sheets dispersed on the porous AAO show a single, sharp peak having a value of 36 $cm^{-1}$ in FWHM (a full-width at half-maximum). Ferrari et al reported that four Lorentzian peaks are needed to fit the GO-band for a sample with two graphene layers with AB interlayer stacking. Four Lorentzian peaks fitted to the spectra were obtained, even though the two peaks had a very low intensity.

Figure 7:
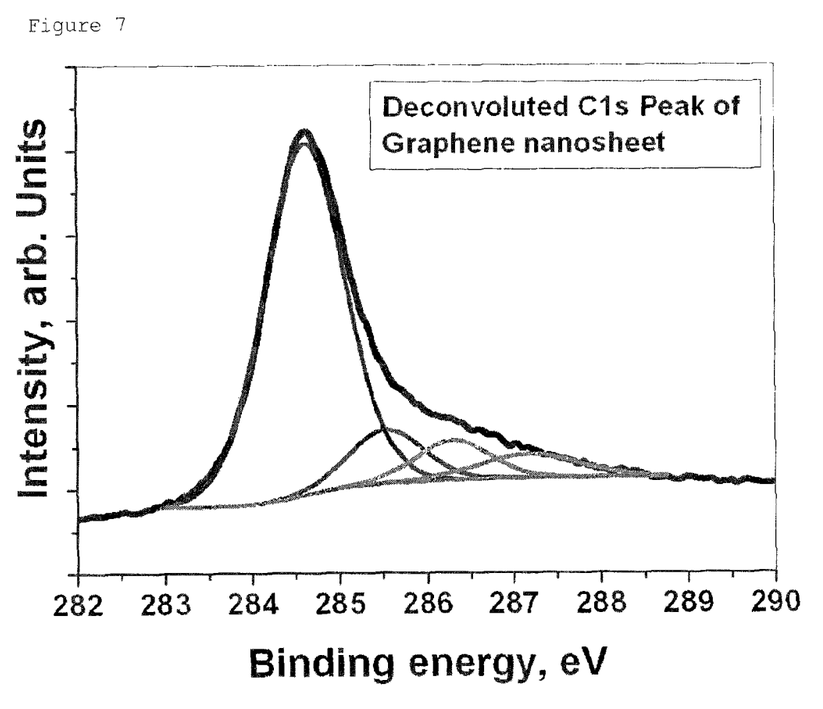
FIG. 7 is a graph showing XPS spectra for graphene sheets collected in one Example of the present invention.

As shown in FIG. 7, the XPS spectra of graphene sheets displayed a single, sharp, strong peak at 284.5 eV. Other very weak peaks could be observed, but are attributable to the stacking of graphene layers.

The above Test Examples show that, according to the preparation method described in Example of the present invention, which is rapid, environmentally-friendly, simple and allows mass production, high-quality graphene (nano) sheets can be obtained from turbostratic graphitic structures, including carbon nanofibers and carbon black.

Also, in the above-described Test Examples, the Raman spectra were obtained using an inVia Reflex micro-Raman spectrometer (Renishaw) with a crystal laser excitation of 514.5 nm operating at 0.1 mW. The SEM photographs were recorded using a cold field emission scanning electron microscope (S-4700, Hitachi, Japan). TEM was carried out on a JEOL JEM 2010 microscope operating at 200 Kv using a holey-carbon-coated copper grid. For both TEM and SEM experiments, a drop of very dilute dispersion after settling was placed on respective substrates and dried under ambient conditions. Nanoprofilometry was carried out by using Nanoview NV 200 with three interferometric objective lens and a vertical resolution of 0.5 nm (Nanosystemz, Korea).

Although the preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method for preparing a graphene sheet, the method comprising the steps of:
   Oxidizing a graphitic structure having a turbostratic structure to produce an oxidized graphitic structure, wherein the oxidation step is carried out by immersing the graphitic structure in hydrogen peroxide, not using one of the group consisting of sulfuric acid, potassium permanganate, carboxylic acid, and formic acid;
   Ultrasonic treating the oxidized graphitic structure immersed in hydrogen peroxide to produce an ultrasonic treated oxidized graphitic structure immersed in hydrogen peroxide;

Subjecting the ultrasonic treated oxidized graphitic structure immersed in hydrogen peroxide to microwave irradiation to produce a few-layer graphene; and Sonicating the few-layered graphene to produce graphene sheets;

Wherein the concentration of hydrogen peroxide used in the oxidation step is 30-40%.

2. The method of claim 1, wherein the ultrasonic treatment is carried out for 20-40 minutes.

3. The method of claim 1, wherein the microwave irradiation step is carried out at 150-550 W for 50-150 seconds after placing the oxidized graphitic structure in a microwave oven.

4. The method of claim 1, wherein the sonication step is carried out by dispersing the few-layer graphene in an alcohol solvent and subjecting the dispersion to strong sonication for 60-240 minutes.

5. The method of claim 1, wherein the sonication step further comprises removing remaining oxide groups from separated graphene sheets resulting from the sonication step.

6. The method of claim 5, wherein the removal step is carried out by dispersing the graphene sheets in a hydrazine solution.

7. The method of claim 1, wherein the graphitic structure is selected from the group consisting of carbon black, carbon fibers, and vapor growth carbon nanofibers (VGCNFs).

8. The method of claim 1, wherein the few-layer graphene has a curved or curled structure.

* * * * *